(12) United States Patent
Choi et al.

(10) Patent No.: US 7,652,416 B2
(45) Date of Patent: Jan. 26, 2010

(54) LAMP HAVING GOOD MAINTENANCE BEHAVIOR OF BRIGHTNESS AND COLOR COORDINATIONS

(75) Inventors: Kwang Wook Choi, Daejeon Metropolitan (KR); Do Hoon Kim, Daejeon Metropolitan (KR); Ick Soon Kwak, Daejeon Metropolitan (KR); Tae Hyun Kwon, Daejeon Metropolitan (KR)

(73) Assignee: Daegoo Electronic Materials Co., Ltd., Kyunggi-Do (KR)

( * ) Notice: Subject to any disclaimer, the term of this patent is extended or adjusted under 35 U.S.C. 154(b) by 546 days.

(21) Appl. No.: 11/390,423

(22) Filed: Mar. 28, 2006

(65) Prior Publication Data

US 2006/0238101 A1  Oct. 26, 2006

(30) Foreign Application Priority Data

Mar. 30, 2005  (KR) .................. 10-2005-0026517

(51) Int. Cl.
*C09K 11/08* (2006.01)
*H01J 1/63* (2006.01)
*G03B 27/54* (2006.01)

(52) U.S. Cl. .............. 313/485; 313/486; 313/487; 252/301.4 R; 428/403

(58) Field of Classification Search ............... None
See application file for complete search history.

(56) References Cited

U.S. PATENT DOCUMENTS 4,088,922 A * 5/1978 Wolfe ................... 313/486

5,998,047 A  12/1999 Bechtel et al.
2004/0051440 A1 * 3/2004 Sugimoto et al. ........... 313/486

FOREIGN PATENT DOCUMENTS

| JP | 09-231944 | 9/1997 |
|---|---|---|
| JP | 11-172244 | 6/1999 |
| JP | 2000-303065 | 10/2000 |
| JP | 2001-240856 | 9/2001 |
| JP | 2002-080843 | 3/2002 |
| JP | 2002-348570 | 12/2002 |
| JP | 2003-082343 | 3/2003 |
| JP | 2003-082344 | 3/2003 |
| JP | 2003-082345 | 3/2003 |
| JP | 2003-147350 | 5/2003 |
| JP | 2003-226872 | 8/2003 |
| JP | 2003-342566 | 12/2003 |
| JP | 2004-244604 | 9/2004 |
| KR | 1020020025483 | 4/2002 |
| KR | 1020030014919 | 2/2003 |
| WO | WO 2005/061658 A1 | 7/2005 |

* cited by examiner

*Primary Examiner*—Sikha Roy
*Assistant Examiner*—Tracie Green
(74) *Attorney, Agent, or Firm*—McKenna Long & Aldridge LLP

(57) ABSTRACT

Disclosed herein is a lamp including a specific phosphor and having good ability to maintain brightness and color coordinates. Particularly, this invention provides a lamp using a phosphor in which a magnetoplumbite phase is epitaxially formed on the surface of a phosphor having a β alumina phase.

11 Claims, No Drawings

LAMP HAVING GOOD MAINTENANCE BEHAVIOR OF BRIGHTNESS AND COLOR COORDINATIONS

TECHNICAL FIELD

The present invention relates to a lamp including a specific phosphor and having good ability to maintain brightness and color coordinates, and more particularly, to a lamp using a phosphor in which a magnetoplumbite phase is epitaxially formed on a phosphor having a β alumina phase. This application claims the benefit of the filing date of Korean Patent Application No. 10-2005-0026517, filed on Mar. 30, 2005, in the Korean Intellectual Property Office, the disclosure of which is incorporated herein in its entirety by reference.

BACKGROUND ART

Generally, barium magnesium aluminate (BAM; [(Ba, $Eu^{2+}$)$MgAl_{10}O_{17}$]) phosphors are used in CCFLs (Cold Cathode Fluorescent Lamps) or EEFLs (External Electrode Fluorescent Lamps) for BLUs (Back Light Units) of LCDs or three-wavelength fluorescent lamps.

Unlike other phosphors (red-$Y_2O_3$:Eu or green-(La,Ce)$PO_4$:Tb) used for three-wavelength lamps (CCFLs or EEFLs), the BAM phosphor suffers because deterioration, such as low luminous properties, severely occurs in the process of burning an organic material serving as a binder (Binder Burn-Out Step=BBO Step) at 700~750° C. upon heat treatment for the fabrication of actual application products, for example, fluorescent lamps, CCFLs, or EEFLs. The deterioration of the BAM phosphor is known as the main reason to cause the deterioration of luminous properties of the phosphors generated under gas discharge during the use of the application product. In particular, it is known that the deterioration (change in color coordinates) of luminous properties of the BAM phosphor greatly affects the change in color coordinates of the three-wavelength lamp.

Thus, depending on the deterioration of the phosphor, the brightness and color coordinates of the lamp are gradually decreased compared to initial lighting. Moreover, the change in color coordinates undesirably results in varied color temperature of the lamp, therefore decreasing performance of display products.

Hence, in order to minimize the deterioration of the BAM phosphor itself, thorough research has been conducted as follows.

Japanese Patent Laid-open Publication No. 2003-82345 discloses a method of oxidizing part of $Eu^{2+}$ to $Eu^{3+}$ without the use of additional compounds, and a method of forming an oxide film or a fluoride film with the addition of Al, Si or La. Japanese Patent Laid-open Publication No. 2003-82344 discloses a method of increasing positive charges through substitution of Al or Mg with a tetravalent element (Ti, Zr, Hf, Si, Sn, Ge, or Ce), in order to prevent deterioration of the phosphor. Further, Japanese Patent Laid-open Publication No. 2003-382343 discloses a method of coating BAM with oxide, such as $SiO_2$, $Al_2O_3$, ZnO, $MgAl_2O_4$, $Ln_2O_3$, $LaPO_4$ or $Zn_2SiO_4$, or fluoride such as $Si(OF)_4$, $La(OF)_3$, or $Al(OF)_3$ and then heat treating such BAM at 300~600° C. in air so as to prevent adsorption of water or carbon dioxide due to the lack of oxygen present in the conductive layer of BAM.

Further, Japanese Patent Laid-open Publication No. 2002-348570 discloses a technique for heat treating a BAM phosphor containing silicon at 500~800° C. in air so as to prevent deterioration of the phosphor under vacuum UV light. Korean Patent Laid-open Publication No. 2003-14919 discloses a technique for surface treating only a selective portion of the surface of a phosphor, thereby minimizing a decrease in performance due to coating. Korean Patent Laid-open Publication No. 2002-0025483 discloses a technique for continuously coating the surface of a BAM phosphor with $SiO_2$ to a thickness of 5~40 nm to cover the surface of the phosphor such that the phosphor does not deteriorate. U.S. Pat. No. 5,998,047 discloses a technique for coating the surface of a BAM phosphor with catena polyphosphates such that the phosphor does not deteriorate due to UV light. Japanese Patent Laid-open Publication No. 2000-303065 discloses a technique for coating a BAM phosphor, which is a phosphor for use in vacuum UV light, with borates, phosphates, silicates, halogens, nitrates, sulfates and carbonates containing Ba or Sr as a cation in order to prevent the thermal degradation of the phosphor. Also, Japanese Patent Laid-open Publication No. 2002-080843 discloses a technique for coating a first BAM phosphor with second phosphor powder that emits UV light, to prevent the decrease in performance of the first phosphor.

In addition, research into improvement of the properties of phosphor for increasing the ability to maintain brightness of a lamp as a specific application product example is as follows.

According to Japanese Patent Laid-open Publication Nos. Hei. 11-172244 and 9-231944, Japanese Patent Laid-open Publication Nos. 2002-348570, 2003-147350, 2003-226872, and 2004-244604, when the surface of a phosphor is treated with nitric acid and metal oxide, such as $La_2O_3$, $Y_2O_3$, $SiO_2$, or $Gd_2O_3$, to form a 5-100 nm thick of rare earth metal oxide film on the surfaces of the phosphor particles (Japanese Patent Laid-open Publication No. Hei. 11-172244), or when the surface of a phosphor is coated with carbonates of rare earth metal (Japanese Patent Laid-open Publication Nos. 2003-147350, 2003-226872, 2004-244604), deterioration of brightness due to vacuum UV light was reported to decrease. However, the above patents reported only decreased degree of brightness and not a decrease in initial brightness itself of the phosphor due to coating, and also do not mention ability to maintain color coordinates.

In the case where the protective film is formed on the surface of the phosphor, the luminous efficiency varies with the thickness of the film. When the surface treatment amount is large, the decrease in efficiency is also large but the ability to maintain brightness is good. Further, the surface treatment material may entail a negative result of coagulating phosphor particles due to its action as a binder, as well as the positive function as a protective film. The phosphor thus coagulated exhibits poor dispensability upon actual use and therefore cannot be formed into a uniform coating film, undesirably leading to non-uniform color coordinates or brightness.

DISCLOSURE

Technical Problem

Accordingly, the present invention has been made keeping in mind the above problems occurring in the prior art, and an object of the present invention is to provide a lamp using a phosphor having high initial brightness and good ability to maintain brightness and color coordinates.

Mode for Invention

The present invention provides to a lamp using a phosphor in which a magnetoplumbite phase is epitaxially formed on the surface of a phosphor having a β alumina phase.

As for the phosphor having a β alumina phase, a phosphor, particularly [($M^{II}$, $Eu^{2+}$)$MgAl_{10}O_{17}$] or [($M^{II}$, $Eu^{2+}$)(Mg, Mn)$Al_{10}O_{17}$], wherein the $M^{II}$ is Ba, Ca, Sr or mixtures thereof, and part of or all of the Als are substituted with Ga, may be used.

The magnetoplumbite phase may be formed without the use of additional compounds, or may be formed through chemical bonding with material having a magnetoplumbite (MP) structure.

The lamp may be used as BLU lamps, for example, CCFLs or EEFLs, for use in display devices such as fluorescent display plates, X-ray photographic tubes, LCDs, PDPs and CRTs, or as lamps for illumination systems.

The magnetoplumbite is a material having a structure very similar to β alumina phase, and, as an example, the magnetoplumbite may be a material represented by Formula 1 below:

$$M_1^{(II)}M'^{(III)}_{12}O_{19} \qquad \text{Formula 1}$$

in Formula 1, $M_1^{(II)}$ is Ca, Sr, Pb or Eu, and $M'^{(III)}$ is Al, Ga or mixtures thereof.

In addition, as an example, the magnetoplumbite may be represented by Formula 2 below:

$$M_2^{(III)}M''^{(II)}M'^{(III)}_{11}O_{19} \qquad \text{Formula 2}$$

in Formula 2, $M_2^{(III)}$ is lanthanide including La, Ce, Pr, Nd, Sm, Eu or Gd, $M''^{(II)}$ is Ni, Co, Fe, Mn or Mg, and $M'^{(III)}$ is Al, Ga or mixtures thereof.

In addition, as an example, the magnetoplumbite may be represented by Formula 3 below:

$$M_3^{(III)}M'^{(III)}_{11}O_{18} \qquad \text{Formula 3}$$

in Formula 3, $M_3^{(III)}$ is La, Ce or mixtures thereof, and $M'^{(III)}$ is Al, Ga or mixtures thereof.

The magnetoplumbite phase selectively chemically surface-modifies only the specific crystal plane of the phosphor having a β alumina phase, particularly the BAM phosphor, that is, the crystal plane lying parallel to the c axis of the crystal thereof.

According to conventional techniques, a BAM phosphor having a changed composition is heat treated to improve only ability to maintain brightness, or a BAM phosphor, which has an original composition and preferred emission color, is simply coated with a protective film, thus forming a phosphor. However, the present invention is characterized by using a phosphor in which the specific crystal plane of a phosphor having a β alumina phase, that is, the plane lying parallel to the c axis of crystal thereof, is selectively surface-modified with a magnetoplumbite crystal structure that is chemically bonded with the phosphor having a β alumina phase, particularly the BAM phosphor and is physicochemically similar to a β alumina phase as the crystal structure of the phosphor. The advantages and effects of the phosphor used in the present invention are described below.

First, the phosphor used in the present invention has properties that deteriorate little upon high-temperature heat treatment required in the process of manufacturing a lamp when the phosphor is applied to an actual application product such as CCFL. For example, when manufacturing a CCFL, there is less decrease in luminous efficiency or in emission color purity resulting from deterioration of the properties of the phosphor by permeation of water into the crystal structure of the phosphor at high temperature (700~750° C.). For example, according to the present invention, the change in emission color from deep blue to greenish blue (increase of y value in C.I.E. color coordinates) does not occur. Thereby, it is possible to fabricate CCFLs/EEFLs having high brightness and little change in color coordinates.

Second, in application products manufactured using the above phosphor, performance thereof, for example, over time, brightness is decreased less and color coordinates is changed less compared to application products manufactured using a conventional BAM phosphor, and therefore the lifetime of the product manufactured using the above phosphor can be increased.

Third, since the phosphor used in the present invention has strong chemical bonding between the magnetoplumbite phase, serving as a protective film, and the β alumina phase of the phosphor, it is highly resistant to mechanical damage, unlike a conventional BAM phosphor having a simple protective film. Hence, there is no trouble related to mechanical damage accompanied by the use of the phosphor, thereby enabling the fabrication of application products having high quality.

The phosphor used in the present invention is prepared according to the following processes. For convenience, although methods of preparing the phosphor, wherein $M'^{(III)}$ is Al, are described below, the methods may be applied to other phosphors.

(Preparation Process I)

The present process provides a method of preparing a phosphor by heat treating a phosphor having a β alumina phase in an oxidation atmosphere without the use of additional material to form a magnetoplumbite phase on the phosphor.

This process is represented by Reaction 1 below:

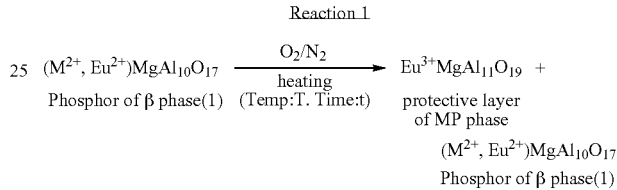

In Reaction 1, M is Ca, Sr, Ba, or mixtures thereof. The ratio of $O_2/N_2$ is 0.01-400%, preferably 0.01-10%, and more preferably 0.1-5%. The heating temperature (T) is 800-1200° C., and preferably 950-1050° C. The heating time (t) ranges from 1 minute to 10 hours, and preferably from 0.5 hours to 3 hours. The heating temperature (T) and heating time (t) may be optimized depending on the amount of phosphor of β alumina phase to be treated, the ratio of $O_2/N_2$, and the heating temperature. The magnetoplumbite phase thus formed is 0.5-5 nm thick, and preferably 0.5-2 nm thick.

(Preparation Process II) Formation of Magnetoplumbite Phase at Low Temperatures (Preparation Process II-1)

The present process provides a method of preparing a phosphor by mixing a BAM phosphor with metal fluoride and then heat treating the mixture at 650~850° C. for 0.5~2 hours in an oxidation atmosphere having a ratio of $O_2/N_2$ of 0.01~100% to form a magnetoplumbite phase on the surface of the BAM phosphor.

Examples of the metal fluoride include divalent metal fluorides, such as $MgF_2$, $ZnF_2$ or $SnF_2$, or trivalent metal fluorides, such as $AlF_3$ or $GaF_3$. The metal fluoride is used in an amount of 0.001~0.02 g, and preferably 0.001~0.01 g, based on 1 g of the BAM phosphor.

(Preparation Process II-2)

The present process provides a method of preparing a phosphor by exchanging Ba or Eu ion, present in the conductive layer of a BAM phosphor having a β alumina phase that has a layered structure wherein spinel layer ($MgAl_{10}O_{16}$) and a conductive layer $\{(M^{II}, Eu^{2+})O\}$ are continuously laminated, with a cation (M) capable of forming a magnetoplumbite phase and then heat treating such a phosphor in an oxidation atmosphere to form the magnetoplumbite phase on the surface of the BAM phosphor. The ratio of $O_2/N_2$ in the oxidation atmosphere is preferably 0.01~100%, and the heat treatment is preferably conducted at 650~850° C. for 0.5~2 hours. In this case, in order to decrease the heat treatment temperature, fluoride of cation able to form the magnetoplumbite phase may be used when exchanging the ion. In the case where the fluoride of cation is used, the heat treatment temperature may be decreased to 650~750° C.

Examples of the cation (M) include $Ca^{2+}$, $Sr^{2+}$, $Eu^{3+}$, $La^{3+}$ or $Gd^{3+}$, and the fluoride of cation is used in an amount of 0.001~0.02 g, based on 1 g of the BAM phosphor.

According to this process, the BAM phosphor is mixed with the ion exchange material, after which the mixture is heat treated at 650~750° C. for 1-2 hours at a heating rate of 10° C./min under controlled oxygen partial pressure and is then cooled at a rate of 10° C./min, thereby preparing a phosphor having water resistance.

This process is represented by Reaction 2 below:
Reaction 2
<Preparation Process II-2 using Ion Exchange Step>

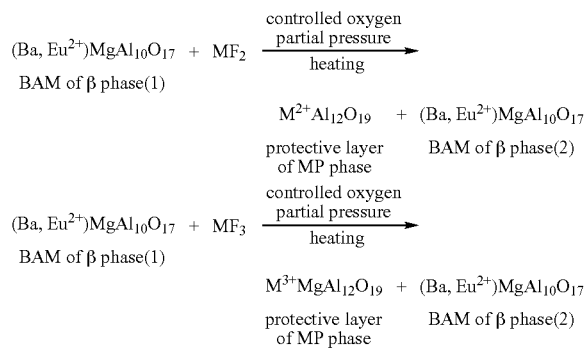

1) The BAM phosphor is mixed with $MF_x$ at a predetermined ratio, after which the mixture is heat treated at 650~750° C. while maintaining predetermined oxygen partial pressure.

2) The $MF_x$ of 1) may be prepared according to the following procedure:

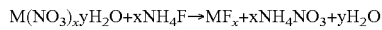

$M(NO_3)_xyH_2O + xNH_4F \rightarrow MF_x + xNH_4NO_3 + yH_2O$ (Preparation Process II-3)

The present process provides preparation of a phosphor by mixing a BAM phosphor of β alumina phase with metal fluoride and metal nitrate and then heat treating the mixture at 650~750° C. for 0.5~2 hours in an inert atmosphere to form a magnetoplumbite phase on the surface of the BAM phosphor.

That is, the process provides preparation of a phosphor having excellent water resistance, that is, low deterioration of the luminous properties, by simultaneously adopting the process using the metal fluoride (Preparation Process II-1) and also the process of exchanging the Ba or Eu ion present in the conductive layer of the BAM phosphor with the cation capable of forming the magnetoplumbite phase (Preparation Process II-2).

The metal fluoride is exemplified by divalent metal fluorides, such as $MgF_2$, $ZnF_2$ or $SnF_2$, or trivalent metal fluorides, such as $AlF_3$ or $GaF_3$. Such metal fluoride is preferably used in an amount of 0.001~0.02 g, based on 1 g of the BAM phosphor. In the present process, the amount of $MF_x$, such as $MgF_2$ or $AlF_3$, may be controlled, thereby changing the heat treatment temperature.

The metal (L) of metal nitrate includes $Ca^{2+}$, $Sr^{2+}$, $Eu^{3+}$, $La^{3+}$ or $Gd^{3+}$, and is used in an amount of 0.001~0.02 g, based on 1 g of the BAM phosphor.

The inert atmosphere may be maintained using nitrogen, argon, or gas mixture thereof.

According to the present process, the BAM phosphor is uniformly mixed with the additives and then dried to obtain a mixed phosphor which is then heat treated at 650~850° C. for 0.5~2 hours at a heating rate of 10° C./min in a controlled inert atmosphere and is thereafter cooled at a rate of 10° C./min, thereby preparing the phosphor used in the present invention.

This process, which is used to promote the formation of the magnetoplumbite phase, simultaneously adopts the processes of II-1 and II-2, represented by Reaction 3 below:

Reaction 3

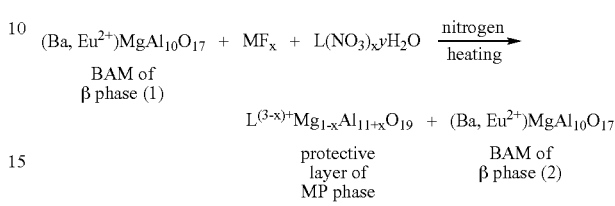

In Reaction 3, M is $Mg^{2+}$ or $Al^{3+}$, L is $Ca^{2+}$, $Sr^{2+}$, or trivalent lanthanide such as $Eu^{3+}$, $La^{3+}$ or $Gd^{3+}$.

1) The BAM phosphor is mixed with $MF_x$ (1~20 mmol/g BAM, preferably 18 mmol/g BAM) and $L(NO_3)_xyH_2O$ (1~10 mmol/g BAM, preferably 6~9 mmol/g BAM) at a predetermined ratio, and the mixture is heat treated at 650~850° C. in an inert atmosphere such as nitrogen atmosphere.

2) $MF_x$ and $L(NO_3)_xyH_2O$ of 1) may be prepared using the following stock solutions:

Stock solutions of $M(NO_3)_xyH_2O$, $x(NH_4)F$, $L(NO_3)_w zH_2O$ (Preparation Process III)

The present process provides a method of preparing a phosphor by mixing a BAM phosphor with material having a magnetoplumbite phase and then heat treating the mixture in an inert atmosphere.

The material having a magnetoplumbite phase is prepared by mixing $M_1X_3$, $M_2(NO_3)_2$ and $Al(OR)_3$, in which $M_1$ is lanthanide such as $Eu^{3+}$, $Ce^{3+}$ or $La^{3+}$, X is $Cl^-$ or $NO_3^-$, $M_2$ is $Mg^{2+}$, and OR is alkoxide. The $M_1$ is preferably used in an amount of 0.002~0.05 mmol, based on 1 g of the BAM phosphor.

The inert atmosphere includes nitrogen, argon or a gas mixture thereof, and the heat treatment temperature is 800~1000° C.

The present process includes adding the material having the magnetoplumbite phase to the phosphor, and heat treating the mixture to form a protective film of the magnetoplumbite phase on the surface of the BAM phosphor of β alumina phase, as simply represented by Reaction 4 below:

Reaction 4

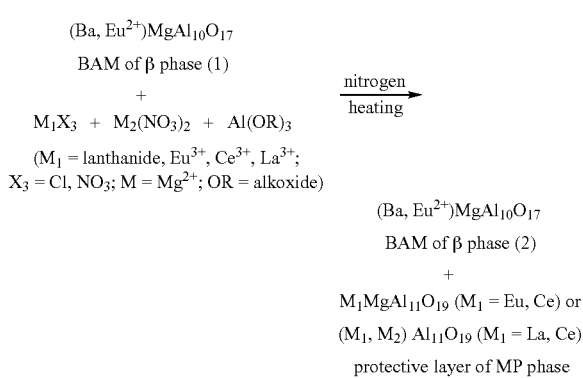

The phosphor, in which the magnetoplumbite phase is epitaxially formed on the phosphor having a β alumina phase, particularly the BAM phosphor [$(M^{II}, Eu^{2+})MgAl_{10}O_{17}$], may be used as a blue phosphor or as a green phosphor. The lamp using the phosphor according to the present invention may be a monochromatic lamp using only the above phosphor or a monochromatic or polychromatic lamp additionally using one or more other phosphors. The above phosphor may be applied to lamps using a typical process known in the art.

The lamp of the present invention may be a BLU lamp used for display devices, such as fluorescent display plates, X-ray photographic tubes, LCDs, PDPs and CRTs, or a lamp for use in illumination systems. The BLU lamp may be a CCFL or EEFL.

Further, the present invention provides display devices, such as fluorescent display plates, X-ray photographic tubes, LCDs, PDPs and CRTs, or illumination systems, each of which includes the lamp mentioned above.

A better understanding of the present invention may be obtained through the following examples which are set forth to illustrate, but are not to be construed as the limit of the present invention.

PREPARATIVE EXAMPLE 1

Ba, Eu, Mg and Al were mixed together at a molar ratio of 0.9:0.1:1.0:10, and $AlF_3$ was added thereto as flux in a predetermined amount. The mixture was burned at 1400° C. for 2 hours in a gas mixture atmosphere comprising nitrogen/hydrogen mixed at a volume ratio of 95:5.

After the completion of the burning process, the phosphor was ball milled, washed with water, and then dried, thus obtaining a phosphor having a composition of $Ba_{0.9}Eu_{0.1}MgAl_{10}O_{17}$ (BAM: $Eu^{2+}$).

PREPARATIVE EXAMPLE 2

200 g of the BAM:$Eu^{2+}$ phosphor prepared in Preparative Example 1 was placed in a furnace, maintained at 950° C. for 2 hours at a heating rate of 5° C./min while supplying the gas mixture of $N_2+O_2$ (a volume ratio of 99.9:0.1), and then cooled at a rate of 5° C./min, thus obtaining a desired phosphor.

PREPARATIVE EXAMPLE 3

500 g of the BAM:$Eu^{2+}$ phosphor prepared in Preparative Example 1 was mixed with 1.25 g of $AlF_3$, after which the mixture was placed in a furnace, maintained at 750° C. for 1 hour at a heating rate of 5° C./min while supplying the gas mixture of $N_2+$air (2.5 wt % air/$N_2+$air gas mixture), and then cooled at a rate of 5° C./min, thus obtaining a desired phosphor.

PREPARATIVE EXAMPLE 4

1 g of the BAM:$Eu^{2+}$ phosphor prepared in Preparative Example 1, 0.2975 mmol (0.0608 g) of aluminum isopropoxide ($Al(O^iPr)_3$), 0.0035 mmol (0.00152 g) of cerium nitrate ($Ce(NO_3)_3\cdot(6H_2O)$), and 0.0215 mmol (0.0093 g) of lanthanum nitrate ($La(NO_3)_3\cdot(6H_2O)$) were stirred along with 10 ml of distilled water and then heated to remove the solvent. The dried phosphor powder was heat treated at 900° C. for 2 hours in a nitrogen atmosphere (heating rate: 10° C./min), thus obtaining a desired phosphor.

EXPERIMENTAL EXAMPLE 1

Deterioration Test of Monochromatic CCFL by Vacuum UV Light

The color coordinates of the phosphor of the present invention in a powder state and the color coordinates thereof after manufacturing the CCFL through a BBO step were compared with the change in color coordinates of a conventional BAM phosphor without a protective film, and the extent of decrease in luminous properties was measured (thermal deterioration). As the extent of change ($\Delta x$, $\Delta y$) was decreased, the ability to maintain color coordinates of the phosphor was judged to be excellent.

Upon manufacturing the lamp, the phosphors prepared in Preparative Examples 1 and 2 were used. 500 g of the blue phosphor was mixed with 250 ml of a solution comprising IPA (Isopropyl Alcohol) and BA (Butyl Acetate) admixed at 50:50, 40 ml of bonding agent slurry, and 2 ml of neutralization solution, and the viscosity was adjusted to 10 sec using a solution of NC (Nitrocellulose). The mixture solution was rolled for 72 hours and then applied on the lamp. The size of the lamp for the experiment was set to $\Phi=2.4$ mm and $L=400$ mm.

Using the phosphors prepared in Preparative Examples 1 and 2, a blue monochromatic CCFL was manufactured and then measured for luminous properties thereof. The results are given in Table 1 below. From these results, it can be seen that the lamp using the phosphor prepared in Preparative Example 2 has luminous properties superior to the lamp manufactured using the conventional BAM phosphor (Preparative Example 1).

Such results were obtained by comparing the measurement value immediately after manufacturing the lamp (0 hours) with the measurement value of the phosphor in a powder state, excluding the deterioration due to vacuum UV light under mercury vapor. The phosphor of Preparative Example 2 was more resistant to thermal deterioration caused by the lamp manufacturing process (BBO step) than was the conventional phosphor (Preparative Example 1).

TABLE 1

| Phosphor | % Brightness[1] | Powder | | Upon Manufacturing Lamp[2] | | Change in Color Coordinates[3] | |
|---|---|---|---|---|---|---|---|
| | | x | y | x | y | x | y |
| Pre. Ex. 1 | 100 | 0.145 | 0.055 | 0.153 | 0.071 | 0.008 | 0.016 |
| Pre. Ex. 2 | 100 | 0.146 | 0.054 | 0.154 | 0.061 | 0.008 | 0.007 |

[Note]
[1]Relative Brightness after heat treatment at 600° C. was taken as 100%
[2]$\Phi = 2.4$ mm, $L = 400$ mm,
[3]Difference between color coordinates of phosphor in powder state after heat treatment at 600° C. and color coordinates thereof after manufacturing the lamp

EXPERIMENTAL EXAMPLE 2

Lifetime Test of Monochromatic CCFL

The lifetime test (700 hours) of the CCFL manufactured in Experimental Example 1 was conducted. The results are given in Table 2 below. The change in color coordinates ($\Delta x$, $\Delta y$) was represented by the difference between the initial color coordinates of the lamp and the color coordinates thereof after 700 hours. Hence, unlike in Experimental Example 1, the difference of color coordinates observed in Experimental Example 2 shows the deterioration of the phosphor due to vacuum UV light under mercury vapor. As the above difference was decreased, the ability to maintain color coordinates was judged to be good.

In the properties (ability to maintain brightness/color coordinate) of the phosphor prepared in Preparative Example 2, the brightness maintenance was increased by 13% and the changes in color coordinates ($\Delta x$, $\Delta y$) were 45% and 50%, respectively, compared to the conventional BAM phosphor (Preparative Example 1). From these results, the phosphor of Preparative Example 2 was confirmed to be resistant to deterioration of phosphor in vacuum UV light.

TABLE 2

| Phosphor | % Brightness[1] | Change in Color Coordinates[2] | |
|---|---|---|---|
| | | x | y |
| Pre. Ex. 1 | 87.1 | 0.0011 | 0.004 |
| Pre. Ex. 2 | 101 | 0.0005 | 0.002 |

[Note]
[1]The brightness of lamp at 0 hours was taken as 100% ($\Phi$ = 2.4 mm, L = 400 mm,)
[2]Difference between color coordinates (x, y) of lamp at 0 hours and color coordinates thereof after 700 hours

EXPERIMENTAL EXAMPLE 3

Lifetime Test of Trichromatic CCFL

In order to evaluate the effects of the phosphor according to the present invention and the conventional BAM phosphor on the deterioration of a trichromatic lamp (CCFL), a trichromatic lamp was manufactured using the same red-$Y_2O_3$:Eu and green-$(La,Ce)PO_4$:Tb phosphors and the lifetime test (2000 hours) was conducted.

As the blue phosphor for manufacturing the lamp, the phosphors of Preparative Examples 1 and 2 were used. As the red and green phosphors, conventional phosphors (red-$Y_2O_3$: Eu, and green-$(La,Ce)PO_4$:Tb) were used. The mixing ratio of trichromatic phosphors was red: 43.60 wt %, green: 33.20 wt %, and blue: 23.20 wt %. The slurry was prepared by mixing 500 g of the phosphors with 250 ml of a solution comprising IPA+BA, 40 ml of binding agent slurry, and 2 ml of neutralization solution and adjusting the viscosity of the mixture to 10 sec using an NC (nitrocellulose) solution. The mixture solution was rolled for 72 hours and then applied on the lamp. The size of the lamp for experiment was set to $\Phi$=2.4 mm and L=400 mm, and the mean color coordinates of the lamp were x=0.3 and y=0.3.

The initial color coordinates of the lamp were set as (x,y=0.3) in all experiments. The same red/green phosphors were used. Thus, the deterioration of the properties of the lamp was judged based on the deterioration of the properties of the blue phosphor used. The change in color coordinates was represented by the difference between the initial color coordinates of the lamp and the color coordinates thereof after 2000 hours. As such, as the difference was decreased, the ability to maintain color coordinates was determined to be good.

The results of the lifetime test (2000 hours) of the trichromatic CCFL manufactured using each of the phosphor of Preparative Example 2 and the conventional BAM phosphor (Preparative Example 1) are given in Table 3 below. In the properties (ability to maintain brightness/color coordinate) of the phosphor prepared in Preparative Example 2, the brightness maintenance was increased by 4% and the changes in color coordinates ($\Delta$x, $\Delta$y) were 31% and 36%, respectively, compared to the conventional BAM phosphor (Preparative Example 1). From these results, the properties (ability to maintain brightness/color coordinate) of the trichromatic CCFL manufactured using the phosphor of Preparative Example 2 were confirmed to be superior to those of the lamp manufactured using the conventional BAM phosphor.

TABLE 3

| Phosphor | % Brightness[1] | Change in Color Coordinates[2] | |
|---|---|---|---|
| | | x | y |
| Pre. Ex. 1 | 88 | 0.008 | 0.011 |
| Pre. Ex. 2 | 92 | 0.0025 | 0.004 |

[Note]
[1]The brightness of lamp at 0 hours was taken as 100% ($\Phi$ = 2.4 mm, L = 400 mm,)
[2]Difference between color coordinates (x, y) of lamp at 0 hours and color coordinates thereof after 2000 hours

EXPERIMENTAL EXAMPLE 4

Lifetime Test of Trichromatic EEFL

In order to evaluate the effects of the phosphor of the present invention and the conventional BAM phosphor on deterioration of trichromatic lamp (EEFL), a comparison experiment similar to Experimental Example 3 was conducted.

As the blue phosphor for manufacturing the lamp, the phosphors of Preparative Examples 1 and 2 were used. As the red and green phosphors, conventional phosphors (red-$Y_2O_3$: Eu, and green-$(La,Ce)PO_4$:Tb) were used. The mixing ratio of trichromatic phosphors was red: 25.8 wt %, green: 27.7 wt %, and blue: 45.5 wt %. The slurry was prepared by mixing 500 g of the phosphors with 250 ml of a solution comprising IPA+BA admixed at 50:50, 40 ml of binding agent slurry, and 2 ml of a neutralization solution, and adjusting the viscosity of the mixture to 9.6 sec using an NC solution. The mixture solution was rolled for 72 hours and then applied on the lamp. The size of the lamp for experiment was set to $\Phi$=4.0 mm and L=600 mm, and the mean color coordinates of the lamp were x=0.248 and y=0.224.

Since the same red/green phosphors were used, the deterioration of the properties of the lamp could be judged based on the deterioration of the properties of the blue phosphor used. The change in color coordinates was represented by the difference between the initial color coordinates of the lamp and the color coordinates thereof after 1000 hours. As such, as the difference was decreased, the ability to maintain color coordinates was determined to be good.

The results of the lifetime test (1000 hours) of the trichromatic EEFL manufactured using each of the phosphor of Preparative Example 2 and the conventional BAM phosphor (Preparative Example 1) are given in Table 4 below. In the properties (ability to maintain brightness/color coordinate) of the phosphor prepared in Preparative Example 2, the brightness maintenance was increased by 1.6% and the changes in color coordinates ($\Delta$x, $\Delta$y) were 41.7% and 36.4%, respectively, compared to the conventional BAM phosphor (Preparative Example 1). From these results, the properties (ability to maintain brightness/color coordinate) of the trichromatic EEFL manufactured using the phosphor of Preparative Example 2 were confirmed to be superior to those of the lamp manufactured using the conventional BAM phosphor.

TABLE 4

| Phosphor | % Brightness[1] | Change in Color Coordinates[2] | |
|---|---|---|---|
| | | x | y |
| Pre. Ex. 1 | 93 | 0.005 | 0.0075 |
| Pre. Ex. 2 | 96 | 0.0035 | 0.005 |

[Note]
[1] The brightness of lamp at 0 hours was taken as 100% ($\Phi$ = 4.0 mm, L = 600 mm.)
[2] Difference between color coordinates (x, y) of lamp at 0 hours and color coordinates thereof after 1000 hours

INDUSTRIAL APPLICABILITY

The lamp of the present invention has initial brightness and mechanical properties superior to those of conventional lamps. Further, a phosphor, in which a magnetoplumbite phase as a protective film is epitaxially formed on the surface of a phosphor having a β alumina phase, particularly a BAM phosphor, is highly resistant to thermal deterioration caused by a lamp manufacturing process and to deterioration by vacuum UV light due to mercury discharge, and thus can prevent a decrease in brightness and a change in color coordinates of the lamp during the lamp manufacturing process and lighting process. Therefore, the lamp manufactured using the above phosphor can have good ability to maintain brightness and color coordinates. Such results greatly affect the ability to maintain brightness and color coordinates of trichromatic CCFL/EEFLs manufactured using the same red/green phosphors. Consequently, the CCFL/EEFLs using the phosphor can have high ability to maintain brightness and color coordinates.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lamp comprising a phosphor in which a magnetoplumbite phase is epitaxially formed on a surface of a phosphor having a β alumina phase,
wherein the phosphor having a β alumina phase includes a phosphor [(M$^{II}$, Eu$^{2+}$)MgAl$_{10}$O$_{17}$] or [(M$^{II}$, Eu$^{2+}$)(Mg, Mn)Al$_{10}$O$_{17}$] (where M$^{II}$ is Ba, Ca, Sr, or mixtures thereof];
wherein the phosphor having a β alumina phase is a blue phosphor; and
wherein the magnetoplumbite phase comprises material represented by Formula 1, 2, or 3 below:

$$M_1^{(II)}M'^{(III)}{}_{12}O_{19} \qquad \text{Formula 1}$$

$$M_2^{(III)}M'''^{(II)}M'^{(III)}{}_{11}O_{19} \qquad \text{Formula 2}$$

$$M_3^{(III)}M'^{(III)}{}_{11}O_{18} \qquad \text{Formula 3}$$

wherein $M_1^{(II)}$ is Ca, Sr, Pb or Eu,
$M'^{(III)}$ is Al, Ga or mixtures thereof,
$M_2^{(III)}$ is lanthanide including La, Ce, Pr, Nd, Sm, Eu or Gd,
$M'''^{(II)}$ is Ni, Co, Fe, Mn or Mg, and
$M_3^{(III)}$ is La, Ce or mixtures thereof.

2. The lamp according to claim 1, which is a monochromatic lamp or a polychromatic lamp.

3. The lamp according to claim 1, wherein the display device is selected from the group consisting of fluorescent display plates, X-ray photographic tubes, LCDs, PDPs, and CRTs.

4. The lamp according to claim 1, which is a cold cathode fluorescent lamp or an external electrode fluorescent lamp.

5. The lamp according to claim 1, wherein the magnetoplumbite phase is 0.5~5 nm thick.

6. The lamp according to claim 1, wherein the magnetoplumbite phase selectively chemically surface-modifies a crystal plane lying parallel to a c axis of crystal of the phosphor having a β alumina phase.

7. A display device comprising the lamp of claim 1.

8. The display device according to claim 7, which is selected from the group consisting of fluorescent display plates, X-ray photographic tubes, LCDs, PDPs and CRTs.

9. An illumination system comprising the lamp of claim 1.

10. A display device comprising the lamp of claim 5.

11. An illumination system comprising the lamp of claim 5.

* * * * *

UNITED STATES PATENT AND TRADEMARK OFFICE
CERTIFICATE OF CORRECTION

PATENT NO. : 7,652,416 B2  Page 1 of 1
APPLICATION NO. : 11/390423
DATED : January 26, 2010
INVENTOR(S) : Kwang Wook Choi It is certified that error appears in the above-identified patent and that said Letters Patent is hereby corrected as shown below:

Title page item (73) should read

--(73) Assignee: Daejoo Electronic Materials Co., Ltd.,
Kyunggi-Do (KR)--

Signed and Sealed this

Eighth Day of June, 2010

David J. Kappos
*Director of the United States Patent and Trademark Office*